INVENTORS
CLIFFORD J. LEWIS
ELDON R. DeMENT

United States Patent Office 3,533,820
Patented Oct. 13, 1970

3,533,820
PRODUCTION OF IRON OXIDE PIGMENTS
Clifford Jackson Lewis, Lakewood, and Eldon Ray De Ment, Golden, Colo., assignors to Southwest Enterprises, Inc., Magnolia, Ark., a corporation of Arkansas
Filed Apr. 13, 1965, Ser. No. 447,625
Int. Cl. C09c 1/24
U.S. Cl. 106—304                     5 Claims

ABSTRACT OF THE DISCLOSURE

The present invention pertains to reacting raw iron ore with sulfuric acid for pigment production and eliminating the need for caustic addition via the precipitation route. The present process employs the technique of injecting a solution of iron sulfate directly into hot combustion gases, the resulting flash drying yields an iron sulfate product which is a superior iron sulfate for calcining to iron oxide pigments.

---

This invention pertains to a novel process and apparatus for producing dried solid particles, such as iron sulfate, from a mixture whereby the said mixture is injected directly into hot combustion gases.

Various methods are well known to those skilled in the art for drying wet and/or hygroscopic material such as iron sulfate. Very fine subdivisions of iron sulfate are required in producing iron oxide pigments such as those used in paints, mortar colors, floor tiling, rubber goods, animal feeds, etc.

The source of iron in iron oxide pigments may be in the form of raw iron ore, copperas by-product from the pickling of steel or the wet processes production of titanium dioxide, or as scrap iron. One practice has been to react iron ore with sulfuric acid and calcine the entire reacted mass in water to separate the dissolved iron sulfate from undissolved impurities and then evaporate the resulting iron sulfate solution, essentially a solution of ferric sulfate, in dryers, after which the dried iron sulfate is calcined to iron oxide pigments of various colors and properties. This route in particular has a practical disadvantage residing in the difficulty of drying ferric sulfate. Ferric sulfate is extremely corrosive during the drying operation and goes through a plastic or semi-fluid state, which gives rise to much mechanical difficulty. Another widely used procedure for producing iron oxide pigments is to calcine copperas which has been produced by crystallizing the copperas from its solution. This process, while apparently possessing advantages over the ore/sulfuric acid route for the reason indicated, nevertheless has the disadvantage of evolving copious quantities of $SO_2$ gas. A further disadvantage is the difficulty of controlling the conditions in the rotary kilns employed so that the resulting pigment color is faithful. For reasons of the nature just cited, as well as others, the iron oxide pigment industry has relied more and more on precipitation processes in which solutions of ferrous sulfate are reacted with scrap iron under carefully controlled conditions of temperature and crystal seeding to precipitate the desired iron oxide colors directly, without the subsequent need for calcining the precipitate. Processes of this nature have the advantage of much improved color control and the production of soft and extremely fine particles of iron oxide. However, there is the important economic disadvantage in that such precipitation processes require an alkali such as sodium hydroxide or sodium carbonate to maintain the necessary pH to result in the precipitation of the desired iron end product. While the precipitation route results in products which must not necessarily be more finely ground prior to use, this cannot be said for the processes which simply roast copperas or calcine ferric sulfate which has been produced as previously described. These latter two processes require that the roasted or calcined product be subjected to fine grinding as in a roller mill, ball mill, or jet mill, in order to obtain pigments of the required fine particle size.

The pure form of ferrous oxide (FeO) is black whereas the pure form of ferric oxide is red. The relative proportions of these two materials in a finshed iron oxide pigment therefore have an important effect on the pigment color. Moreover, it is well known that contaminants such as manganese and copper, when converted in their oxides during the roasting process, also materially affect the color of the end product pigment. Such mineral diluents ultimately affect the tinting strength of an iron oxide pigment. It is obvious, therefore, that present processes for producing iron oxide pigments must either tolerate the discoloration and dilution resulting from impurities present in the iron oxide pigment or else resort to relatively costly procedures for removing said impurities.

It is an object of this invention to rapidly dry wet or hygroscopic mixtures.

Another object of this invention is to rapidly or instantaneously remove the water from dispersions, solutions or slurries of iron sulfate.

Yet another object of the invention is to rapidly or instantaneously remove the water from a solution or slurry of iron sulfate and to convert the iron sulfate into iron oxide pigment.

Still another object of this invention is to provide an apparatus for rapidly or instantaneously removing liquid from dispersions, solutions or slurries of mixtures.

The present invention pertains to a novel procedure for taking advantage of the superior economics of reacting raw iron ore with sulfuric acid for pigment production while simultaneously eliminating the need for caustic addition via the precipitation route and the need for a fine grinding operation in any case. When a solution of iron sulfate is injected directly into hot combustion gases, the resulting flash drying yields an iron sulfate product which is a superior iron sulfate for calcining to iron oxide pigments in that the resulting pigments are faithful in color and require no further grinding or size reduction. The pigments produced by calcining such flash dried iron sulfate are extremely soft and of uniform particle size smaller than 325 mesh.

The normal procedure to produce $Fe_2O_3$ from the dried iron sulfate is to calcine said sulfate in a second system (rotary kiln, etc.). However, in the present invention the calcination of iron sulfate to iron oxide may be carried out directly within the flash dryer by simply increasing the temperature to the necessary value within the drying chamber. Such calcination yields a pigment of a chemical composition and size distribution identical to that produced by a second external calcination system.

Furthermore, simple hammer mill treatment of the pigment produces particle sizes on the order of 1 micron or less. In addition, this invention circumvents the formation of the plastic and intermediate iron sulfate product and avoids the corrosion problems of drying iron sulfate. Finally, the present invention makes it possible to introduce additives (such as toners, i.e., zinc sulfate, sodium chloride, etc., and catalysts) directly into the iron sulfate solution being fed to the flash dryer, thus yielding an ultimate intimately mixed mass of the dried iron sulfate and additive that is practically impossible to achieve when said materials are mixed in their solid state condition. It will also be appreciated that if particular ratios of ferrous to ferric iron are desired in the iron sulfate product, these can readily be obtained by adjusting the ferrous to ferric iron ratio in the feed solution prior to introducing the solution into the flash dryer. The resuting dried product has ferrous and ferric values which has obtained the ultimate in intimacy of mixing and results in improved iron oxide pigments when the mixture of dried sulfates is roasted or calcined.

The flash drying technique is not to be confused with the so-called spray drying technique or with a fluidizing bed technique. Spray drying usually involves superheated steam or a hot gas or gases applied to a solution spray or wet solids feed in such a manner as to remove water without overheating the desired end product. Furthermore, the product in commercial spray dryers is in contact with the hot gases for a relatively long period of time. Such prolonged contact periods would be detrimental to the dried iron sulfate for subsequent production of brilliant iron oxide pigment. Likewise, it is doubtful if the oxidizing-reducing conditions necessary for producing completely ferric, completely ferrous, or controlled ratios of ferrous to ferric iron could be achieved by spray drying pocedures. On the other hand, by controlling the ratio of air to fuel, such as gas or oil used in the flash drying technique, it is possible to maintain conditions in the flash dryer necessary for controlling the ferrous to ferric iron ratio as may be desired. Moreover, the iron sulfate is almost instantaneously separated from its water by utilizing the high velocity of the hot combustion gases and the instantaneous water removal procedure in conjunction with cyclones. Also, corrosion or subsequent chemical reactions are avoided by instantaneously heating the iron sulfate solution above its dew point simultaneous with the water removal process.

In the flash drying technique, the resulting solid iron sulfate is almost instantaneously removed from contact with hot gases, since at no time is there even the smallest bed of iron sulfate present in the flash dryer. This contrasts sharply with the fluidized bed technique for drying iron sulfate such as described by Patterson in U.S. Pat. No. 3,053,626.

It might be well to point out here that Patterson's process, while teaching the recovery of iron oxide from pickle liquor, relates to the treatment of solutions of heavy metal sulfates where the production of sulfur dioxide and an end product in the form of an oxide of the heavy metal is desired. Patterson's apparatus is in no way to be confused with our flash dryer. Patterson teaches the spraying of pickle liquor (ferrous sulfate solution) into the top of a fluidized bed containing a mass of finely divided oxide as a bed so that the feed solution, fuel and combustion air react in the bed to produce the desired removal of water and decomposition of iron sulfate to iron oxide. The process of that patent specifically involves "spraying the sulfate solution in said closed second environment above the heated oxide." This procedure would by no means produce the extremely fine particle size and composition controlled ferric sulfate resulting from the flash dryer in which there is at no time any bed of solids involved. Also the present invention contrasts sharply with the teachings of the patent to O. S. Neill (U.S. 1,607,206, Nov. 16, 1926). While Neill claims "atomizing a liquor (containing iron compounds) into a chamber to produce a basic iron compound in the form of a finely divided powder," the patent teaches the production of a wet mass of basic iron compound which is then fed by means of a valve arrangement from his reactor into an externally fired calcining furnace from which hot gases are led back to his atomizing and dehydrating chamber. The apparatus as shown by Neill could not possibly accomplish the objectives of the present invention. In particular Neill's teaching visualizes a bed of incompletely dried iron compound in the atomizing chamber of his apparatus in direct contrast to the operation of the flash dryer which, at no time, has any type of solids bed and from which iron sulfate of a definite composition is removed instantly and completely. Likewise, the Neill teaching utilizes heated air and at no time does the solution of iron compounds contact direct combustion gases as per flash drying. Finally, it may be pointed out that the flow of iron solution and heated air, as taught by Neill, is downwards so that the resulting basic iron compounds of apparently variable composition must impinge on the bottom of the atomizing chamber and thereby remain in contact with the moisture-laden gases for a finite period. On the other hand in the flash drying process of this invention, the iron solution is injected into the combustion gases of a flame moving upwards at high velocity and the iron sulfate (acid not basic) is instantly removed from the gas stream.

The herein claimed invention is more fully described with reference to the accompanying drawings, wherein:

Figure 1:
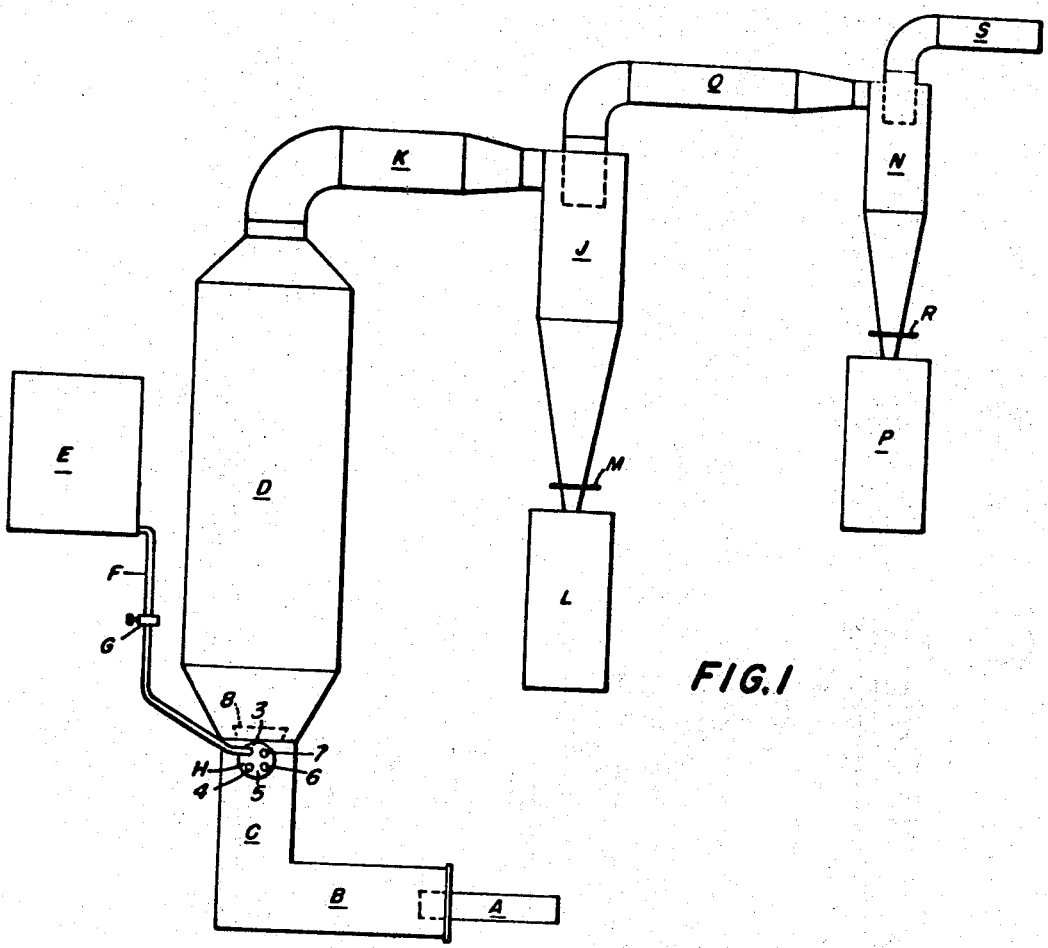
FIG. 1 is a drawing of the flash drying apparatus.

In FIG. 1, the hot combustion gases are supplied by A, the burner for the system which is supplied with carburetor or pre-mixed gas and air, B is the combustion chamber in which the gas-air mixture is burned to produce the hot combustion gases which are transferred to the drying chamber D by outlet or riser C. The liquid feed or solution is stored in container E and fed through pipe F and valve G into the drying chamber D by the liquid feed inlet or injection assembly H. The particles are carried from the liquid feed inlet assembly H into and through the drying chamber D by the hot combustion gases and into cyclone J by tangential conduit or duct pipe K. The dried particles are separated from the gases in the cyclone J and ejected into a receiving chamber or compartment L through slide valve M used to close off the cyclone outlet during removal of the material from the receiving container, chamber or compartment L. The spent gas from cyclone J is fed into the second cyclone N by a tangential inlet conduit or duct pipe O for additional particle separation. The particles are ejected into receiving container, chamber or compartment P through slide valve R. The exhaust or spent combustion gases are vented to the atmosphere by vent pipe S.

Figure 2:
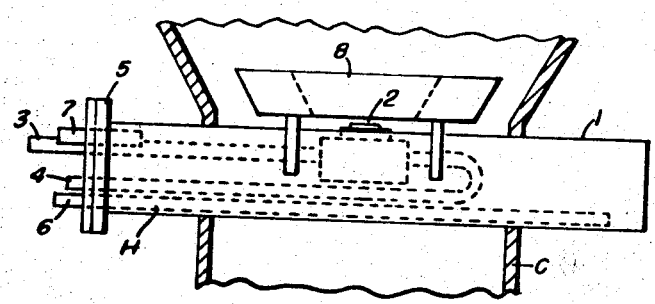
FIG. 2 is a detailed drawing of the liquid feed injector assembly or aspirator.

FIG. 2 is a detailed drawing of the feed injection assembly or aspirator H, having tube 1 sealed at one end. Inserted into the tube and projecting upwards from it is a spray nozzle 2 of the aspirating type. The nozzle is connected to the liquid feed source by pipe 3 and to a compressed air source by pipe 4. These pipes extend through the cover plate 5 which is also penetrated by pipes 6 and 7. Pipes 6 and 7 are inlet and outlet respectively for cooling liquid such as water. Attached to the tube 1 and resting around the nozzle 2 is a conically shaped flow plate 8. The assembled unit is installed in the location shown in large drawing FIG. 1 at H. Liquid feed for the unit is contained in the tank E and is connected to the injection or feed assembly H at the liquid feed or injection inlet 3 by tubing F which may be blocked or opened by means of a screw clamp or valve G.

In operation, the iron sulfate solution to be dryed is placed in the solution container E. The tubing F connecting the container to the injection or feed inlet 3 is closed by a screw clamp or valve G. Cooling water is admitted to the feed or aspirator assembly H at pipe 6 and discharged through pipe 7. The burner A is then ignited, and adjusted to produce the desired temperature, as measured by a thermocouple, in the drying chamber D. A compressed air source is connected to nozzle 2 by means of pipe 4 and the air delivered to the nozzle is adjusted to about 60 p.s.i. Iron sulfate solution is then admitted to nozzle 2 through line 3 and is aspirated, atomized or sprayed into the drying chamber D by the air under pressure. Hot gases produced in the combustion chamber B enter the drying chamber D through the riser C portion of the combustion chamber and are prevented from coming into contact with nozzle 2 by the flow plate 8. The flow plate 8 also prevents the iron sulfate particles from coming into contact with the drying chamber D walls by directing the hot combustion gases along the drying chambers D walls. The hot gases pass through the drying chamber D (with a velocity on the order of 6 to 10 feet per second), and simultaneously remove water from the solution phase particles emerging from the nozzle 2, and transport them through the conduit or duct K to the cyclone J. Here, the now dry, solid iron sulfate particles are removed from the gas stream and are deposited in container, chamber or compartment L through the open slide valve M. Flue gases, containing some dry iron sulfate, from cyclone J are directed by conduit or duct O to cyclone N where any remaining iron sulfate particles are separated and deposited in container P through the open slide valve R. The solids-free flue gases are then vented to atmosphere through duct S.

At intervals, the slide valves M and R are closed and containers L and P are emptied. After the containers have been emptied, the slide valves are reopened, and the operation continues undisturbed.

As an illustration of the invention the results obtainable by the production of iron oxide pigments from reacting a raw iron ore with sulfuric acid are given in the following examples. However, the invention is not limited to the processing of raw ore with sulfuric acid or to the use of a solution of ferric sulfate only. The invention is applicable to the processing of any mixture such as solutions, dispersions and slurries or combinations of such containing dissolved iron for the production of dried iron sulfate for further processing to iron oxide pigments, and, in fact, some iron oxide pigments have been produced directly by operating the flash dryer at temperatures which decompose the iron sulfate directly in the dryer. In order to decompose the iron sulfate directly in the dryer the temperature of the drying chamber must be raised to the appropriate temperature.

EXAMPLE 1

200 lbs. iron ore analyzing 84.8% $Fe_2O_3$ was closely mixed with 326 lbs. of 96% $H_2SO_4$ and allowed to react. The reacted mass was leached with sufficient hot water to yield a solution containing 175 grams $Fe_2(SO_4)_3 \cdot 4H_2O$ per liter of solution. This solution was then evaporated in an electrically heated oven in pans until a solid dry mass was obtained. The dry $Fe_2(SO_4)_3 \cdot 4H_2O$ was then ground in a Raymond hammer mill. The particle size of the ground ferric sulfate was as follows:

| Screen size, m.: | Percent of material retained on screen |
|---|---|
| +100 | 0.0 |
| −100+150 | 4.8 |
| −150+200 | 12.2 |
| −200+270 | 27.6 |
| −270+325 | 29.8 |
| −325+400 | 22.6 |
| −400 | 3.0 |

This dried and ground ferric sulfate was placed in a ceramic tray and heated in a muffle furnace at 1400° F. to produce a red pigment. The particle size of the resulting pigment was as follows:

| Screen size, m.: | Percent of material retained on screen |
|---|---|
| +100 | 0.0 |
| −100+150 | 0.0 |
| −150+200 | 15.9 |
| −200+270 | 18.4 |
| −270+325 | 28.0 |
| −325+400 | 22.5 |
| −400 | 19.2 |

The pigment as produced was then ground in the hammer mill and the particle size analysis was as follows:

| Screen size, m.: | Percent of material retained on screen |
|---|---|
| +100 | 0.0 |
| −100+150 | 0.0 |
| −150+200 | 0.0 |
| −200+270 | 8.0 |
| −270+325 | 12.3 |
| −325+400 | 28.6 |
| −400 | 51.1 |

A portion of the hammer mill ground pigment was then ground in a wet ball mill for a period of 24 hours. The particle size analysis was as follows:

| Screen size, m.: | Percent of material retained on screen |
|---|---|
| +100 | 0.0 |
| −100+150 | 0.0 |
| −150+200 | 0.0 |
| −200+270 | 0.0 |
| −270+325 | 1.9 |
| −325+400 | 5.8 |
| −400 | 92.3 |

EXAMPLE 2

200 pounds of the same iron ore as used in Example 1 were again reacted with sulfuric acid to again produce an iron sulfate solution analyzing as per the solution of Example 1. However, instead of drying this solution by simple evaporation in a rotary dryer or a pan dryer, this solution was aspirated into the flash dryer already described. The conditions used for flash drying were as follows:

Temperature in the drying chamber—300° C.
Gas velocity in the drying chamber—8 ft./second
Dryer atmosphere—oxidizing The particle size of the resulting ferric sulfate issuing from the flash dryer was as follows:

| Screen size, m.: | Percent of material retained on screen |
|---|---|
| +100 | 0.0 |
| −100+150 | 0.0 |
| −150+200 | 0.0 |
| −200+270 | 2.8 |
| −270+325 | 27.9 |
| −325+400 | 48.8 |
| −400 | 20.5 |

This ferric sulfate of the indicated particle size was placed in an indirectly heated rotary kiln and calcined to a bright red iron oxide. The particle size of the iron oxide after calcining was as follows:

| Screen size, m.: | Percent of material retained on screen |
|---|---|
| +200 | 0.0 |
| −200+270 | 0.0 |
| −270+325 | 0.0 |
| −325+400 | 1.2 |
| −400 | 98.8 |

Another portion of this ferric sulfate dried in the flash dryer was placed in a ceramic tray and heated in a muffle furnace to result in a brilliant red iron oxide. The particle size of this iron oxide determined directly from a sample of the calcined material from the tray was as follows:

| Screen size, m.: | Percent of material retained on screen |
|---|---|
| +100 | 0.0 |
| −100+150 | 0.0 |
| −150+200 | 0.0 |
| −200+270 | 0.0 |
| −270+325 | 0.0 |
| −325+400 | 0.0 |
| −400+600 | 0.0 |
| −600+800 | 0.0 |
| −800+5µ | 16.5 |
| −5µ+1µ | 27.7 |
| −1µ | 65.8 |

It is apparent from the data illustrated in Examples 1 and 2 that the flash drying technique results in a calcined iron oxide of a particle size which requires no further grinding or size reduction to make it commercially acceptable. This point is further illustrated by the screen analysis of the unground calcined material resulting from the flash drying process as compared with the screen analysis of commercial pigments obtained in the field as follows:

| Screen size, m. | Commercial 161, percent | Commercial 602, percent | SWE P-32, percent | SWE P-34, percent |
|---|---|---|---|---|
| +200 | 0.0 | 0.0 | 0.0 | 0.0 |
| −200+270 | 0.0 | 0.0 | 0.0 | 0.0 |
| −270+325 | 2.0 | 0.0 | 0.0 | 0.0 |
| −325+400 | 9.0 | 0.0 | 1.6 | 1.5 |
| −400 | 89.0 | 100.0 | 98.4 | 98.5 |

A particular advantage of the process resides in the kinetics rather than in the thermodynamics involved. As already indicated, the conversion of iron sulfate from a solution form to a solid form by direct contact with hot combustion gases is practically instantaneous. By taking advantage of the kinetic situation it was found that the flash drying technique will consistently produce an iron sulfate of desired residual water content. By control of temperature a completely anhydrous iron sulfate or an iron sulfate containing a definite amount of water of crystallization as shown by Example 3 following can be produced. Ferric sulfate containing 4 molecules of water of crystallization ($Fe_2(SO_4)_3 \cdot 4H_2O$) which is especially desirable for subsequent calcining to red iron oxide pigments can consistently be produced as desired.

EXAMPLE 3

Some of the solution of iron sulfate (as produced in Examples 1 and 2 above) was dried at various temperatures in the flash dryer already described. The dry solids produced were analyzed for water of crystallization and iron content with the following results:

| Flashing temp., ° C. | Percent $H_2O$ | Percent Fe | Corresponding iron sulfate formula |
|---|---|---|---|
| 400 | 0.10 | 27.4 | $Fe_2(SO_4)_3$ |
| 350 | 4.30 | 26.7 | $Fe_2(SO_4)_3 \cdot H_2O$ |
| 300 | 15.28 | 21.3 | $Fe_2(SO_4)_3 \cdot 4H_2O$ |
| 200 | 28.95 | 20.0 | $Fe_2(SO_4)_3 \cdot 9H_2O$ |

Another advantage of the process lies in the fact that additives or toners normally employed for pigment manufacture may be added directly to the iron sulfate solution and dried in situ with the iron sulfate. Such treatment results in a far better distribution of the toner in the iron sulfate than could ever be realized by mechanical mixing of the dry toner with dry iron sulfate. The necessity of such distribution is apparent and is demonstrated further by Examples 4 and 5 following.

EXAMPLE 4

5 pounds of dry $Fe_2(SO_4)_3 \cdot 4H_2O$ as produced and ground in Example 1 above were placed in a mechanical mixer of the double cone type along with 0.2 pound −65 mesh NaCl. The materials were mixed for a period of 4 hours, and subsequently calcined in a ceramic tray in a muffle furnace at 1400° F. The resulting pigment was spotty in appearance. Where the iron sulfate had been in close proximity with the salt, a purple color had developed, while iron sulfate not in proximity with salt was of an orange color. The pigment from the tray was then water washed, dried, and well mixed. The resulting pigment was reddish in hue instead of the desired maroon.

EXAMPLE 5

0.2 pound of NaCl was dissolved in sufficient iron sulfate solution (as produced in Example 2 above) to produce 5 pounds of dry iron sulfate. This solution was then dried in the flash dryer as previously described. The dry solids were then calcined in a ceramic tray in a muffle furnace at 1400° F. The resulting pigment showed no spottiness as observed in Example 4, and was of a clear purple color throughout. The calcined pigment was then water washed, dried, and well mixed. The resulting pigment was maroon in color with no orange or red overtones.

As for the production of an iron oxide pigment by complete calcination of ferric sulphate in the flash dryer as illustrated, the following example is given.

EXAMPLE 6

Ferric sulphate solution as produced in Example 1 was fed to the flash unit under the following conditions:

Temperature in the drying chamber—1400° F.
Gas velocity in the drying chamber—10 ft.
Dryer atmosphere—oxidizing The resulting iron oxide pigment product as it issued from the flash mechanism without any further processing was as follows:

Color—metallic brown
Percent $Fe_2O_3$—98%

Screen size as discharged from the flash dryer

| Screen size, m.: | Percent of material retained on screen |
|---|---|
| +200 | 0.0 |
| −200+270 | 0.0 |
| −270+325 | 0.0 |
| −325+400 | 1.0 |
| −400 | 99.0 |

Screen size after hammer milling

| Screen size, m.: | Percent of material retained on screen |
|---|---|
| +200 | 0.0 |
| −200+270 | 0.0 |
| −270+325 | 0.0 |
| −325+400 | 0.0 |
| −400+600 | 0.0 |
| −600+800 | 0.0 |
| −800+5µ | 12.6 |
| −5µ+5µ | 29.2 |
| −1 | 58.2 |

Even though the present invention has been described by showing its use in drying iron sulfate for the production of iron pigments it may be used to dry a great many other mixtures or hygroscopic material such as copper sulfate, ammonium sulfate, molybdenum sulfate, titanium hydroxide, vanadic acid, etc. to yield their respective forms in an extremely fine state of subdivision.

We claim:
1. A process for the production of iron oxide pigments which process comprises injecting a solution of iron sulfate upwardly through an inlet into a chamber; contacting the injected solution immediately above the inlet with hot, upwardly rising combustion gases directed from a flame beneath the inlet, said gases containing at least one gas which oxidizes iron sulphate; evaporating water from the solution almost instantaneously by such contact to form iron sulphate solids; carrying said solids upwardly in said upwardly rising combustion gases and simultaneously calcining the iron sulphate solids to iron oxide pigment products within the chamber; removing the pigment products from the chamber; and thereafter collecting the pigment products.

2. The process as described in claim 1 in which the ferrous to ferric iron ratio in the iron sulphate solution is adjusted before injecting the solution into the chamber.

3. The process as described in claim 1 in which water soluble additives are introduced into the iron sulphate solution prior to contacting said solution with the combustion gases.

4. The process as described in claim 1 in which the iron sulphate solution is produced by reacting an iron ore with sulphuric acid to produce soluble iron sulphates, and separating the solution of iron sulphates from undissolved material prior to injecting the solution into contact with the combustion gases.

5. A process for the production of very finely divided iron sulphate solids which comprises continuously feeding a solution of iron sulphate to a nozzle inlet of a drying chamber, controlling the temperature of the nozzle inlet by circulating cool water around the nozzle, aspirating said solution into the drying chamber with compressed air at about 60 p.s.i., contacting the aspirated solution above the nozzle inlet with hot, upwardly rising combustion gases directed from a flame beneath the inlet, passing the combustion gases and iron sulphate upwardly through the drying chamber with a velocity of 6 to 10 feet per second while simultaneously evaporating water from the solution phase emerging from the nozzle inlet to form iron sulphate solids separating the solids from the combustion gases and vaporized water by at least one cyclone separator, and removing the iron sulphate from the system.

References Cited

UNITED STATES PATENTS

| | | | |
|---|---|---|---|
| 1,607,206 | 11/1926 | Neill | 23—200 |
| 1,630,881 | 5/1927 | Zalocostas | 23—200 |
| 2,202,414 | 5/1940 | Barnes et al. | 23—200 XR |
| 2,215,394 | 9/1940 | Hechenbleikner et al. | 23—200 XR |
| 2,394,579 | 2/1946 | Ayers | 23—200 |
| 2,452,608 | 11/1948 | Smith | 106—304 |
| 2,541,068 | 2/1951 | Johnson et al. | 23—200 |
| 2,771,344 | 11/1956 | Michel et al. | 23—200 |
| 3,053,626 | 9/1962 | Patterson | 23—200 XR |

TOBIAS E. LEVOW, Primary Examiner

H. M. SNEED, Assistant Examiner